US011524333B2

(12) United States Patent
Schreiner

(10) Patent No.: US 11,524,333 B2
(45) Date of Patent: Dec. 13, 2022

(54) MELTING AND CASTING PROCESS AND COMBINED MELTING AND CASTING FURNACE PLANT

(71) Applicant: BorgWarner Turbo Systems Worldwide Headquarters GmbH, Kirchheimbolanden (DE)

(72) Inventor: Jens Schreiner, Hamburg (DE)

(73) Assignee: BorgWarner Turbo Systems Worldwide Headquarters GmbH, Kirchheimbolanden (DE)

( * ) Notice: Subject to any disclaimer, the term of this patent is extended or adjusted under 35 U.S.C. 154(b) by 0 days.

(21) Appl. No.: 17/327,161

(22) Filed: May 21, 2021

(65) Prior Publication Data

US 2021/0362220 A1 Nov. 25, 2021

(30) Foreign Application Priority Data

May 24, 2020 (DE) .......................... 102020003065.3

(51) Int. Cl.
*B22D 11/103* (2006.01)
*B22D 27/09* (2006.01)
*F27B 14/08* (2006.01)
*F27B 14/12* (2006.01)
*F27B 14/20* (2006.01)
*B22D 11/00* (2006.01)
*F27B 14/00* (2006.01)

(52) U.S. Cl.
CPC .......... *B22D 11/103* (2013.01); *B22D 11/001* (2013.01); *B22D 27/09* (2013.01); *F27B 14/0806* (2013.01); *F27B 14/12* (2013.01); *F27B 14/20* (2013.01); *F27B 2014/008* (2013.01); *F27B 2014/0887* (2013.01); *F27M 2001/02* (2013.01)

(58) Field of Classification Search
CPC ........ B22D 27/09; B22D 18/00; B22D 18/04; B22D 47/00; B22D 47/02; B22C 9/08; B22C 9/086; B22C 9/088
See application file for complete search history.

(56) References Cited

U.S. PATENT DOCUMENTS 5,791,398 A * 8/1998 Ono ....................... B22D 18/04
164/337

* cited by examiner

*Primary Examiner* — Kevin P Kerns
*Assistant Examiner* — Steven S Ha
(74) *Attorney, Agent, or Firm* — Howard & Howard Attorneys PLLC

(57) ABSTRACT

A process for melting metal parts and casting the melt in at least one mould and a corresponding combined melting and casting furnace plant are described. In the process, metal parts to be melted are brought into a crucible furnace, and a molten metal is produced therein and made ready for casting. A riser tube integrated in a lid of the crucible furnace is heated in a position remote from the crucible furnace, and the lid with heated riser tube is brought into a position closing the crucible furnace, in which the riser tube projects into the molten metal. A mould is arranged on the lid in a casting position above the riser tube, and the molten metal is introduced into the mould from below by pressurising the melt in the crucible furnace. The combined melting and casting furnace plant is designed to carry out such a process.

21 Claims, 4 Drawing Sheets

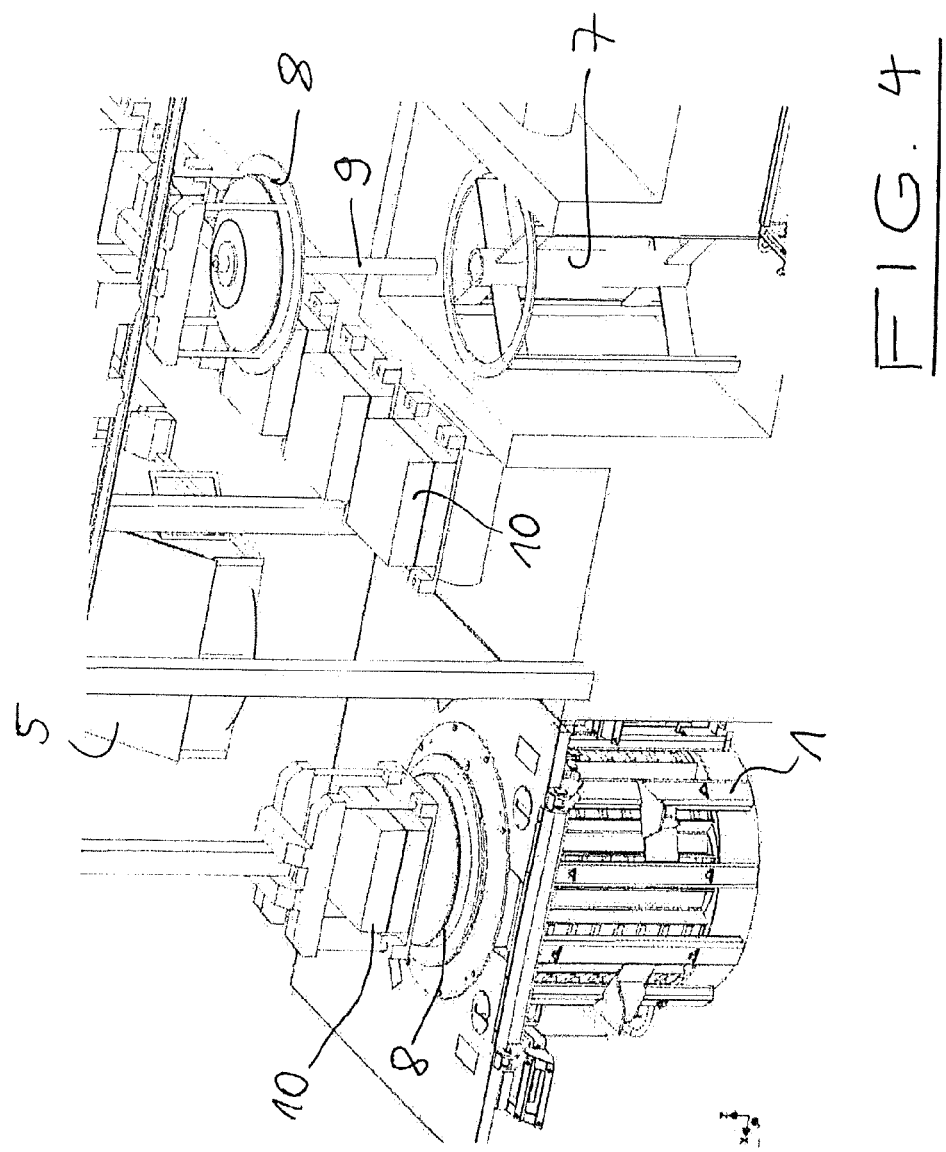

MELTING AND CASTING PROCESS AND COMBINED MELTING AND CASTING FURNACE PLANT

CROSS-REFERENCE TO RELATED APPLICATIONS

This application claims priority pursuant to 35 U.S.C. 119(a) of German Patent Application No. 102020003065.3, filed May 24, 2020, which application is incorporated herein by reference in its entirety.

FIELD OF THE INVENTION

The present invention relates to a process for melting metal parts and for casting the melt into at least one mould or casting mould.

SUMMARY

In a process of this type, the metal parts, for example scrap iron, are brought into a crucible furnace, and a molten metal is produced in the crucible furnace, which is made ready for casting. In addition to gravity casting, a low-pressure casting process is known here, in which a molten metal which has been prepared ready for casting and is located in a ladle or in a casting furnace specially designed for this purpose is forced through a riser tube or through a siphon tube into the appropriate mould by means of pressure acting on the bath surface. Such a process has the advantage that it enables low-turbulence to turbulence-free mould filling.

In the process of this type, casting moulds are used which are made of chemically bonded sand as a flaskless (vertical or horizontal partition, with cores for forming the inner contour) or flasked casting mould (lower and upper flask, with cores), are formed from a layer (1 cm→1 cm) of chemically bonded sand (with cores for forming the inner contour) on a metallic carrier mould, and consist of sand moulds compacted by negative pressure and vibration (loose sand, no chemical binders, lost foam casting).

The object of the present invention is to provide a melting and casting process of the type described above, with which a particularly good casting quality can be achieved in a simple and safe manner.

In accordance with the invention, this object is solved by a process of the type indicated, which comprises the following steps:

a. placing the metal parts in a crucible furnace;
b. producing a molten metal and making it ready for casting in the crucible furnace;
c. heating a riser tube arranged on a lid of the crucible furnace at a position remote from the crucible furnace;
d. moving the lid with the heated riser tube to a position closing the crucible furnace, in which position the riser tube projects into the molten metal;
e. moving the mould to a casting position on the lid and above the riser tube; and
f. pouring the molten metal through the riser tube from below into the mould by pressurising the molten metal in the crucible furnace.

In accordance with the invention, it can be provided that the space between the melt bath surface and the furnace lid is flooded with inert gas, wherein further preferably, the pouring of the molten metal through the riser tube from below into the mould by pressurising the melt in the crucible furnace occurs by means of inert gas. Preferably, helium or argon can be used as the inert gas.

In the process according to the invention, the metal parts to be melted are introduced into the crucible furnace, which can be carried out in the conventional manner or with conventional equipment (vibratory conveyors etc.). In the crucible furnace, a molten metal is produced from the metal parts, which is made ready for casting in the appropriate manner. To prepare for the casting process, which is to be carried out from below by pressurisation (low-pressure casting), a riser tube arranged on a lid of the crucible furnace and preferably integrated into the lid is heated in a position remote from the crucible furnace in order to reduce the temperature difference between the molten metal and the riser tube. The lid is then moved with the heated riser tube to a position closing the crucible furnace, in which position the riser tube projects into the molten metal. The crucible furnace is then made ready for casting.

A mould into which the molten metal is to be poured is then brought into a casting position on the lid and above the riser tube, after which the molten metal is introduced into the mould from below through the riser tube by pressurising the molten metal in the crucible furnace. This achieves the above-mentioned advantages of low-pressure casting compared with gravity casting or tilt casting.

The process according to the invention is characterised in particular by the fact that the riser tube required for the casting process is heated at a point remote from the crucible furnace, which process can be carried out simultaneously with the production of the molten metal in the crucible furnace. Since the riser tube is arranged on or integrated into the lid, the lid with the heated riser tube can be arranged on the crucible furnace immediately after the molten metal has been made ready for casting, wherein the riser tube is heated accordingly and a temperature compensation between the riser tube and the molten metal has taken place. After the installation of the lid with the riser tube, a mould can be brought into its casting position, after which the casting process can be started.

This results overall in a casting process with good timing control (rapid sequence) with corresponding temperature compensation.

In a development of the process according to the invention, the crucible furnace is covered during the production of the molten metal and the preparation of the same for casting by a part of a device for bringing the metal parts into the crucible furnace, which is designed as a hood. With the aid of such a hood, the escape of fumes formed during the production of the molten metal is prevented. In addition, the invention further provides that the fumes formed during the production of the molten metal are extracted above the crucible furnace. According to the invention, therefore, the steps of covering the crucible furnace and extracting the fumes are preferably combined.

As far as the lid with the riser tube according to the invention is concerned, it is preferably moved back and forth between a waiting position, in which the riser tube is heated, and a closing position of the crucible furnace.

The process according to the invention can also be implemented with two crucible furnaces, wherein one is operated in melting mode and one in casting mode alternately. If two crucible furnaces are used, a single lid with a riser tube can be used, which is arranged alternately on one crucible furnace and the other crucible furnace and is provided in between in a waiting position in which the heating of the riser tube takes place. If the lid with the riser tube is on one crucible furnace, a casting process is carried out with it, while with the other crucible furnace, the metal parts to be melted are brought into the crucible furnace and/or a melting process takes place. Once the casting process is complete, the lid with the riser tube is removed from the crucible furnace and guided back to the waiting position for heating or placed directly on the other crucible furnace if the riser tube still has a sufficiently high temperature.

Of course, according to the invention, a single lid with riser tube can also be fed to more than two crucible furnaces, which is not to be excluded according to the invention.

Preferably, in the melting crucible furnace, the melt is prepared ready for casting with respect to temperature, chemical analysis and deslagging. This is independent of whether one or more crucible furnaces are used in the process according to the invention. One or more moulds can be used in the process according to the invention. If several moulds are used, the useful contents of the casting crucible furnace are poured successively into several moulds until the useful contents of the crucible furnace are emptied. In this case, the casting process therefore proceeds in several stages until the crucible furnace is emptied or contains a desired residual content of molten metal.

Preferably, the temperature of the molten metal is kept constant in the casting crucible furnace, which can be carried out by means of suitable heating devices.

The present invention further relates to a combined melting and casting furnace plant having a crucible furnace for producing and making a molten metal ready for casting. This furnace is provided with the following devices:

a device for bringing metal parts to be melted into the crucible furnace;

at least one mould for receiving the molten metal;

a device for bringing the mould into a casting position on the crucible furnace;

a pressure-tight crucible furnace lid and a riser tube arranged thereon, which forms a unit with the crucible furnace lid;

a heating device for the riser tube;

a lifting and traversing device for the crucible furnace lid with a riser tube, and a device for pouring the produced molten metal by pressurising the crucible furnace and feeding the molten metal into the mould from below by means of the riser tube of the crucible furnace.

The device for bringing metal parts to be melted into the crucible furnace can comprise a vibratory conveyor, for example. The device for bringing the mould to a casting position on the crucible furnace can be designed in a conventional manner. This device can be designed to guide a plurality of moulds to the casting position on the crucible furnace and to guide them away from this position after the moulds have been filled.

It is essential to the invention that the crucible furnace be designed to be pressure-tight and have a pressure-tight crucible furnace lid with a riser tube attached to it. This riser tube forms a unit with the lid. The crucible furnace lid with the riser tube is moved back and forth between a casting position on the crucible furnace and a waiting position by a lifting and moving device. In the waiting position, a heating device for the riser tube ensures that it is brought to an elevated temperature in order to reduce the temperature difference to the molten metal.

The provided device for pouring the produced molten metal comprises a device for applying a pressurised gas to the molten metal within the crucible furnace in order to transfer the molten metal upwardly through the riser tube into the mould arranged on the crucible furnace.

In particular, the melting and casting furnace according to the invention is provided with a moveable charging device for the charging material for producing the molten metal. As mentioned, such a charging device can comprise, for example, a vibratory conveyor. Particularly preferably, the device for bringing the metal parts into the crucible furnace is provided with a hood for covering the crucible furnace. In particular, this hood has an extraction device for removing the fumes produced during melting.

Specifically, therefore, the charging device is designed to comprise both a conveyor for the metal parts and a hood connected to this which covers the top side of the crucible furnace and acts as a lid during the melting process. As mentioned, the hood is preferably coupled to an exhaust device which extracts the fumes such that they cannot escape into the surroundings.

In a specific embodiment, the plant according to the invention is designed as a double furnace plant. This plant is preferably set up in such a way that one crucible furnace is in melting mode and the other crucible furnace is in casting mode. In this case, the sequence is as follows:

The charging device with a hood and fume extraction device is located at the crucible furnace, which is operated in melting mode. In this mode, the metal parts to be melted are fed in and a corresponding molten metal is produced in the crucible furnace, which is made ready for casting. During this process, the fumes formed are extracted. Meanwhile, the other crucible furnace is in the casting mode. The crucible furnace is provided with the crucible furnace lid with integrated riser tube, and the molten metal in the furnace is guided by the supplied pressurised gas through the riser tube upwards into the mould arranged in the casting position on the crucible furnace.

When the melting process in the other furnace is complete and the melt is ready for casting, the charging device with the hood is removed from the crucible furnace and the crucible furnace lid with the integrated riser tube is placed on the crucible furnace from a waiting position in which the riser tube has been heated and closed in a pressure-tight manner. The corresponding casting process can now be carried out. In the case of the other crucible furnace, the casting process has been completed in the meantime, such that the charging device with a hood can be moved up to the crucible furnace in order to feed and melt the metal parts. A single crucible furnace lid with an integrated riser tube is therefore used here, which moves back and forth between one crucible furnace and the other.

The plant is further preferably provided with devices for keeping the temperature in the casting furnace constant.

According to the present invention, a melt is preferably used having one of the following compositions, wherein the percentages refer to percentages by weight:

composition having up to 95% iron, as well as chromium, nickel, magnesium, silicon, tungsten, niobium and carbon, and optionally other residual components in an amount of up to 10%;

composition having up to 25% chromium, further components such as chromium, nickel, magnesium, silicon, tungsten, niobium and carbon in an amount of up to 5%, wherein the remainder is iron;

composition having 15 to 25% chromium, up to 1.0% nickel, up to 2.0% magnesium, up to 3% silicon, up to 3% tungsten, up to 2.5% niobium, up to 1% carbon, and up to 1% other components, wherein the remainder is iron;

composition having 20 to 22% chromium, up to 0.5% nickel, 0.5% to 1.0% magnesium, 1.0% to 2.5% silicon, 1.5% to 2.2% tungsten, 1.3 to 1.8% niobium, 0.35% to 0.45% carbon, and up to 1% other components, wherein the remainder is iron; or composition having up to 2% carbon, having less than less than 0.1% P, and having one or more of the following components: C, N, Cr, Ni, Mn, Mo, Si, Nb, V, Ta, Co and optionally other elements in an amount of up to 3% and a remainder of iron.

BRIEF DESCRIPTION OF THE DRAWINGS

The invention is described in detail below using an exemplary embodiment in conjunction with the drawing. Here are shown:

FIG. 4 a part of the plant in spatial representation.

DETAILED DESCRIPTION

Figure 1:
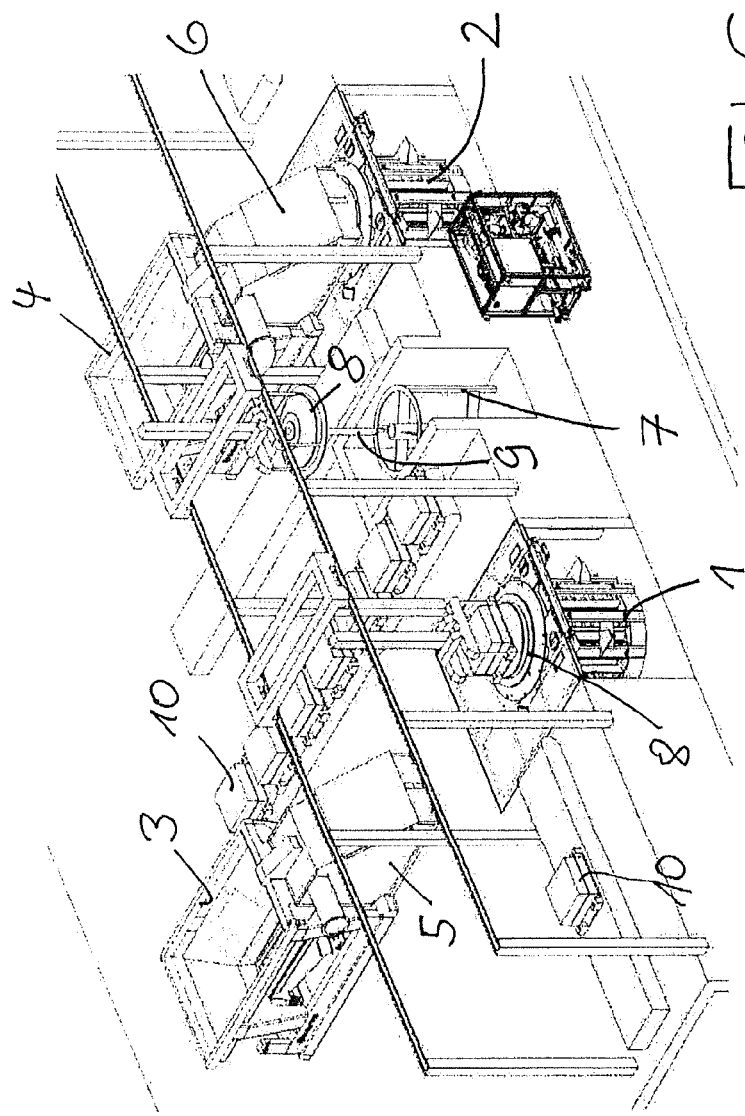
FIG. 1 a spatial representation of a double furnace plant.

The combined melting and casting furnace plant depicted in the figures is a double furnace plant which has two crucible furnaces 1 and 2 arranged adjacent to each other. Here, the crucible furnace 1 depicted in FIG. 1 on the left is a casting process in which moulds 10 are charged with the molten metal melted in the crucible furnace 1, while the crucible furnace 2 depicted in FIG. 1 on the right is in a melting process in which metal parts are melted in the crucible furnace 2. The plant preferably has a single crucible furnace lid 8 which is used alternately by one furnace 1 and the other furnace 2. A centrally downwardly extending riser tube 9 is arranged on the crucible furnace lid 8, which is required for the casting process described below. In FIG. 1, two crucible furnace lids 8 are depicted for better illustration, one of which is located on the crucible furnace 1, while the other lid 8 is depicted above a heating device 7 for the riser tube 9.

Each crucible furnace 1, 2 is provided with a suitable charging device 3, 4, which can be conventionally designed and provided with a suitable vibratory conveyor for feeding metal parts to be melted into the crucible furnace. The respective charging device 3, 4 comprises a hood 5, 6 arranged at its front end, which covers the upper side of crucible furnace during the conveying of the metal parts to be melted into the crucible furnace. In this way, during the melting of the metal parts (melting process), escape of fumes into the surrounding atmosphere is prevented. For this purpose, the charging device 3 is further provided with a suitable exhaust device.

The moulds to be filled with the molten metal are denoted by 10. The moulds 10 are successively guided onto the lid 8 of a crucible furnace, as shown for the left furnace in FIG. 1. After the mould has been filled, it is guided away to the left of the lid in the figure.

The combined melting and casting furnace plant depicted in FIG. 1 is operated in the following manner:

The charging device 4 is filled with metal parts (scrap metal) to be melted in a position spaced apart from the crucible furnace, and the metal parts are fed into the crucible furnace which is open at the top. During this process, the hood 6 covers the top of the crucible furnace. This state is depicted in FIG. 1 with the crucible furnace 2 on the right in the depiction.

The metal parts are now melted in a suitable manner in the crucible furnace 2, such that it results in a metal melt located in the furnace. The exhaust gases produced during the melting process are prevented from escaping into the atmosphere by the hood 6 and are drawn off via a suitable exhaust device. After completion of the melting process, the molten metal is made ready for casting by suitable known means.

While the crucible furnace 2 is in the melting process described above, the crucible furnace 1 is in the casting process. For this purpose, after completion of the melting process, the charging device 3 is removed from the furnace and a crucible furnace lid 8 with a centrally downward projecting riser tube 9 is placed on the crucible furnace 1. This crucible furnace lid 8 with a riser tube 9 has been located separately from the furnace in a suitable heating device 7 to reduce the temperature difference between the riser tube 9 and the molten metal. After the riser tube 9 has been suitably heated, the lid 8 with the riser tube 9 is removed from the heating device 7 and placed on the crucible furnace 1 such that it is closed in this way in a pressure-tight manner A suitable mould 10 for receiving the molten metal is then arranged on the lid in a suitable casting position. This state is depicted in FIG. 1 for the crucible furnace 1 on the left.

The molten metal is then introduced through the riser tube 9 from below into the mould 10 by pressurising the molten metal in the crucible furnace via a gas introduced into the crucible furnace. This low-pressure casting process is known as such. The filled mould 10 is then withdrawn from the crucible furnace 1 and transferred to its position in the heating device 7. The charging device 3 with the hood 5 can then be moved back to the crucible furnace to fill it again with metal parts.

It is understood that suitable moulds 10 are filled with the molten metal until the crucible furnace has been emptied.

In the depicted double furnace plant, therefore, one crucible furnace is always in the melting process, while the other is in the casting process. A single crucible furnace lid 8 with integrated riser tube 9 is used by both crucible furnaces 1, 2 and is fed alternately to each crucible furnace by a heating device 7 arranged between the furnaces for heating the riser tube 9.

Figure 2:
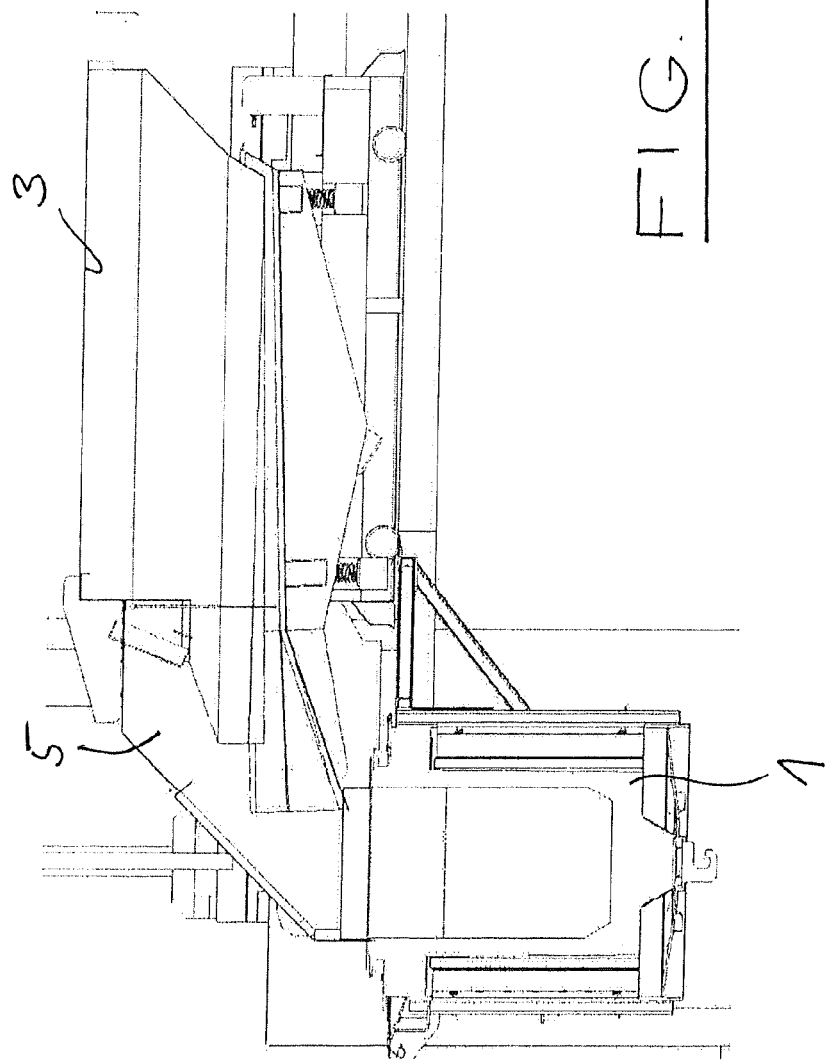
FIG. 2 a side view of part of the plant of FIG. 1 with a charging device and crucible furnace.

FIG. 2 shows the crucible furnace 1 in the melting position, in which the charging device 3 introduces the metal parts to be melted into the crucible furnace 1 from above, wherein the provided hood 5 covers the crucible furnace from above. In this position, the melting process then takes place in the crucible furnace 1, wherein the resulting fumes are collected by the hood and discharged via a suitable exhaust device. The charging device 3 is designed in the shape of a trough and is provided with a suitable vibratory conveyor, which can be designed in the conventional manner.

Figure 3:
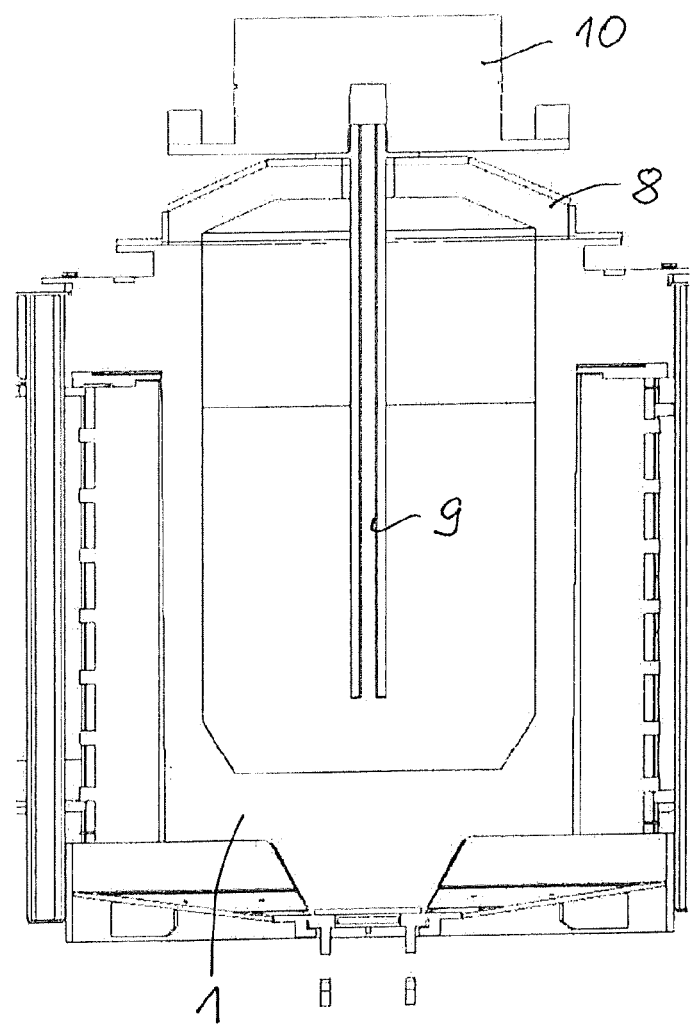
FIG. 3 a vertical section through a crucible furnace of the plant in the casting process.

FIG. 3 shows the crucible furnace 1 in vertical section. The furnace is in the casting position here, in which a crucible furnace lid 8 with integrated riser tube 9 is arranged on the crucible furnace and closes it in a pressure-tight manner. On the lid 8, there is a corresponding mould 10 into which the molten metal to be cast is introduced by pressurising the inside of the furnace with a pressurised gas.

FIG. 4 shows the crucible furnace 1 in the casting position, in which the crucible furnace lid 8 with integrated riser tube 9 is located on the crucible furnace and closes it in a pressure-tight manner A mould 10 to be filled with the molten metal is arranged on the lid.

Furthermore, it can be seen in FIG. 4 how the crucible furnace lid 8 with integrated riser tube 9 is located above a heating device 7 for the riser tube. The lid 8 is moved from this position to the position depicted on the left on the crucible furnace 1. After completion of the melting process, the lid 8 with integrated riser tube 9 is moved back into the heating device 7 so that the riser tube 9 can be heated for the next casting process. This casting process then takes place with the second crucible furnace 2 not depicted in FIG. 4.

The invention claimed is:

1. Process for melting metal parts and casting a molten metal from melting the metal parts into at least one mould for receiving the molten metal, comprising the following steps:
   a. placing the metal parts in a crucible furnace with a device for bringing the metal parts to be melted into the crucible furnace;
   b. producing the molten metal and making the molten metal ready for casting in the crucible furnace;
   c. heating a riser tube, with a heating device, arranged on a pressure-tight crucible furnace lid of the crucible furnace, which forms a unit with the crucible furnace lid, at a position remote from the crucible furnace;
   d. moving, with a lifting and traversing device, the lid with the heated riser tube to a position closing the crucible furnace, in which position the riser tube projects into the molten metal;
   e. moving the at least one mould to a casting position on the lid and above the riser tube with a device for bringing the at least one mould into the casting position on the crucible furnace; and
   f. pouring, with a device for pouring the produced molten metal, the molten metal through the riser tube from below into the at least one mould by pressurising the molten metal in the crucible furnace and feeding the molten metal into the at least one mould.

2. Process according to claim 1, characterised in that, during the pouring of the molten metal through the riser tube, negative pressure is applied in the at least one mould with a device for applying negative pressure to the at least one mould.

3. Process according to claim 1, characterised by a step of flooding a space, with a device for flooding the space, between a molten metal bath surface and the furnace lid with inert gas, wherein the pouring of the molten metal through the riser tube from below into the at least one mould occurs by pressurising the molten metal in the crucible furnace by means of the inert gas.

4. Process according to claim 1, characterised in that the crucible furnace is covered by a part, designed as a hood, of a device for bringing the metal parts into the crucible furnace during production of the molten metal and preparation of the molten metal for casting.

5. Process according to claim 1, characterised in that fumes produced during production of the molten metal are extracted above the crucible furnace with an extraction device for removing the fumes.

6. Process according to claim 1, characterised in that the lid with riser tube is moved back and forth between a waiting position, in which the riser tube is heated, and a closing position of the crucible furnace.

7. Process according to claim 1, characterised in that two crucible furnaces are used in a double furnace plant, wherein one is operated in melting mode and one in casting mode alternately.

8. Process according to claim 7, characterised in that both crucible furnaces are operated with a single lid with riser tube.

9. Process according to claim 1, characterised in that the molten metal is prepared in the melting crucible furnace ready for casting with regard to temperature, chemical analysis and deslagging.

10. Process according to claim 1, characterised in that useful contents of the casting crucible furnace are poured successively into a plurality of moulds until the useful contents are emptied.

11. Process according to claim 1, characterised in that a temperature of the molten metal is kept constant with devices for keeping the temperature constant.

12. Process according to claim 1, characterised in that the riser tube has a temperature resistance and is suitable for casting FE-based alloys and consists of inorganic-chemically or hydraulically bonded refractory concrete of one of the following compositions, wherein the percentages in the following are percentages by weight:
   composition having at least 75% $Al_2O_3$, up to 23% $SiO_2$, up to 1.0% $Fe_2O_3$, up to 0.25% MgO and optionally further residual components CaO and SiC; or
   composition having at least 70% $Al_2O_3$, up to 25% $SiO_2$, up to 1.1% $Fe_2O_3$, up to 1.0% CaO and optionally further residual components MgO and SiC; or
   composition having at least 72.0% SiC, up to 18% $Al_2O_3$, up to 10% $SiO_2$, up to 0.1% $Fe_2O_3$, up to 0.15% MgO, and optionally further residual components CaO;
   wherein in these compositions, the further residual components may optionally be present in an amount of up to 3%.

13. Combined melting and casting furnace plant having
   a crucible furnace for producing and making a molten metal ready for casting,
   a device for bringing metal parts to be melted into the crucible furnace,
   at least one mould for receiving the molten metal,
   a device for bringing the at least one mould into a casting position on the crucible furnace,
   a pressure-tight crucible furnace lid and a riser tube arranged thereon, which forms a unit with the crucible furnace lid,
   a heating device for the riser tube,
   a lifting and traversing device for the crucible furnace lid with the riser tube, and
   a device for pouring the produced molten metal by pressurising the crucible furnace and feeding the molten metal into the mould from below by means of the riser tube of the crucible furnace.

14. Plant according to claim 13, characterised by a device for applying negative pressure to the at least one mould during pouring of the molten metal through the riser tube.

15. Plant according to claim 13, characterised in that the plant is provided with a moveable charging device for charging material for producing the molten metal.

16. Plant according to claim 13, characterised in that the plant has an extraction device for removing fumes produced during melting above the crucible furnace.

17. Plant according to claim 13, characterised in that the device for bringing the metal parts into the crucible furnace is provided with a hood for covering the crucible furnace.

18. Plant according to claim 13, characterised in that the plant is designed as a double furnace plant.

19. Plant according to claim 18, characterised in that the double furnace plant is set up in such a way that one crucible furnace is in melting mode and the other crucible furnace is in casting mode.

20. Plant according to claim 13, characterised in that the plant has devices for keeping the temperature in the casting furnace constant.

21. Plant according to claim 13, characterised by a device for flooding a space between a molten metal bath surface and the furnace lid with inert gas, wherein pouring of the molten metal through the riser tube from below into the at least one mould occurs by pressurising the molten metal in the crucible furnace by means of the inert gas.

* * * * *

UNITED STATES PATENT AND TRADEMARK OFFICE
CERTIFICATE OF CORRECTION

| | |
|---|---|
| PATENT NO. | : 11,524,333 B2 |
| APPLICATION NO. | : 17/327161 |
| DATED | : December 13, 2022 |
| INVENTOR(S) | : Jens Schreiner |

It is certified that error appears in the above-identified patent and that said Letters Patent is hereby corrected as shown below:

In the Claims

Claim 10, Column 8, Line 9, please delete "useful contents of the casting crucible furnace are poured successively into a plurality of moulds until the useful contents are emptied" and replace with
-- contents of the crucible furnace are poured successively into a plurality of moulds until the contents are emptied --

Signed and Sealed this
Twenty-fourth Day of January, 2023

Katherine Kelly Vidal
*Director of the United States Patent and Trademark Office*